United States Patent [19]
Feng-Sing

[11] Patent Number: 6,021,693
[45] Date of Patent: Feb. 8, 2000

[54] METHOD OF MANUFACTURING BLADES FOR SCISSORS

[75] Inventor: Chang Feng-Sing, P.O. Box 82-144, Taipei, Taiwan

[73] Assignees: Chang Feng-Sing; Market USA Promotinal Marketing Inc., both of Taipei, Taiwan

[21] Appl. No.: 09/157,253

[22] Filed: Sep. 21, 1998

[51] Int. Cl.$^7$ .................................................. B21K 11/06
[52] U.S. Cl. .................... 76/106.5; 76/104.1; 264/250; 264/275; 264/279
[58] Field of Search ................... 76/104.1, 106.5, 76/114, 119, DIG. 7; 30/260; 264/250, 275, 279

[56] References Cited

U.S. PATENT DOCUMENTS

| | | | |
|---|---|---|---|
| 2,800,715 | 7/1957 | Cohen | 30/260 X |
| 4,435,901 | 3/1984 | Nishikawa | 76/106.5 X |
| 4,778,640 | 10/1988 | Braun et al. | 264/250 |
| 4,847,030 | 7/1989 | Stalter | 264/279 X |
| 5,053,178 | 10/1991 | Butlin et al. | 264/275 X |
| 5,528,833 | 6/1996 | Sakuma | 76/104.1 X |
| 5,758,422 | 6/1998 | Frank | 30/260 X |

*Primary Examiner*—Douglas D. Watts
*Attorney, Agent, or Firm*—A & J

[57] ABSTRACT

A method of manufacturing a blade for scissors includes steps of: fusing an alloy of zinc and aluminum; filling said alloy into a first mould for manufacturing a metal cutter for scissors; applying high temperature and high pressure to the first mould to form a unitary metal cutter; fitting the metal cutter into a second mould for manufacturing a blade; and squirting viscous resin into the second mould to partially enclose the metal cutter, whereby the blade is sharp, lightweight, durable in use and fit for mass production.

2 Claims, 2 Drawing Sheets

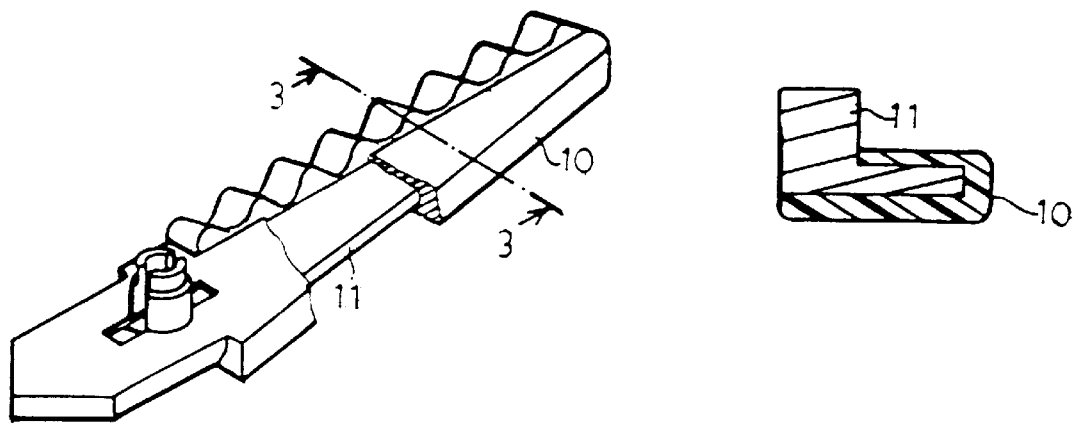
FIG. 1
FIG. 3
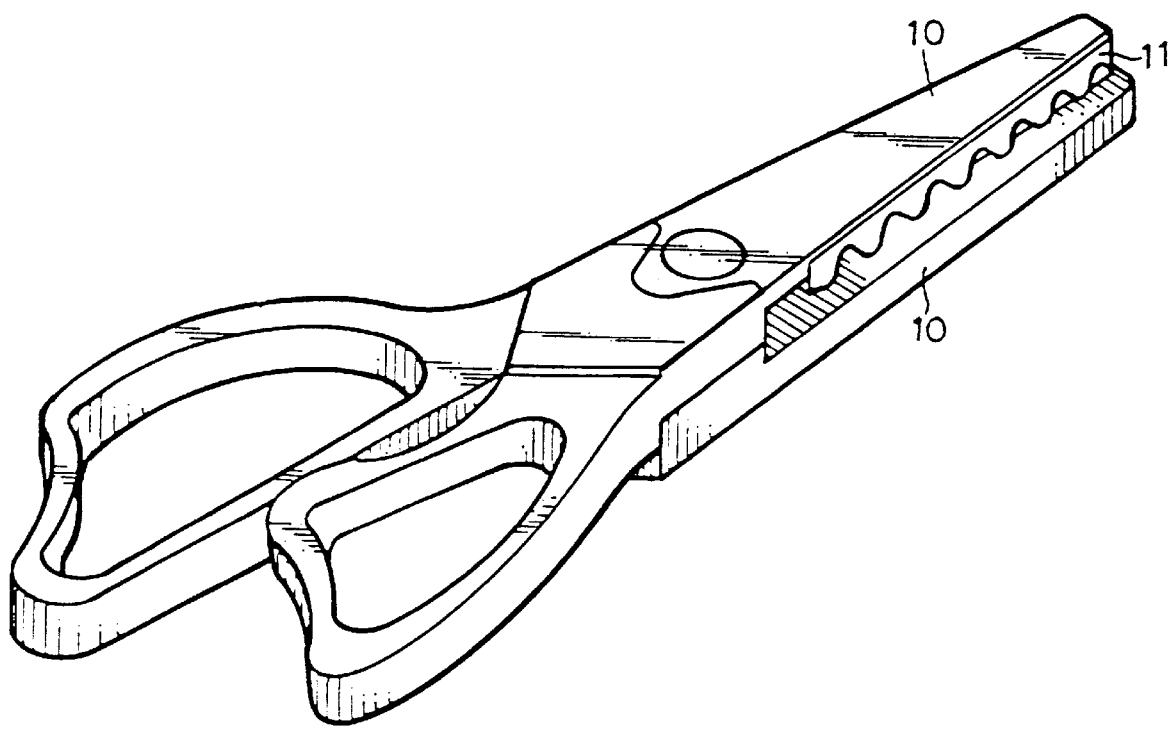
FIG. 2

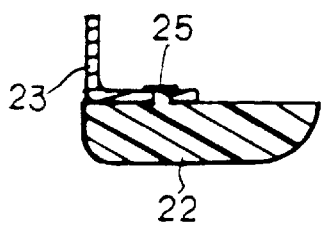
PRIOR ART
FIG. 6
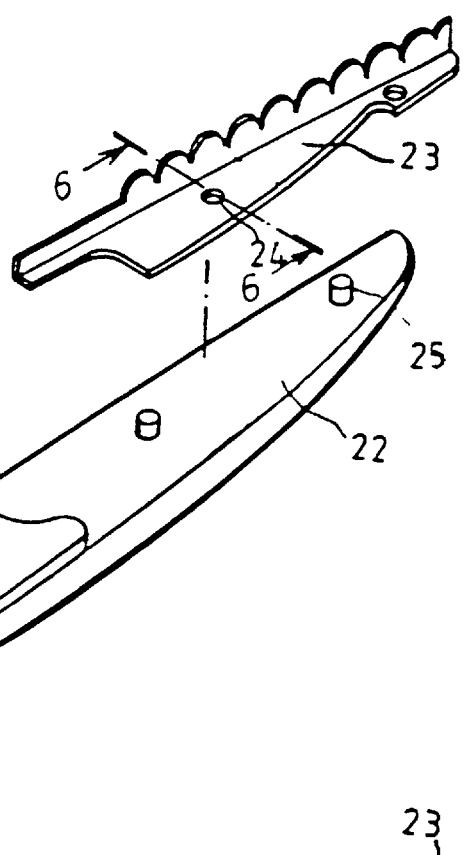
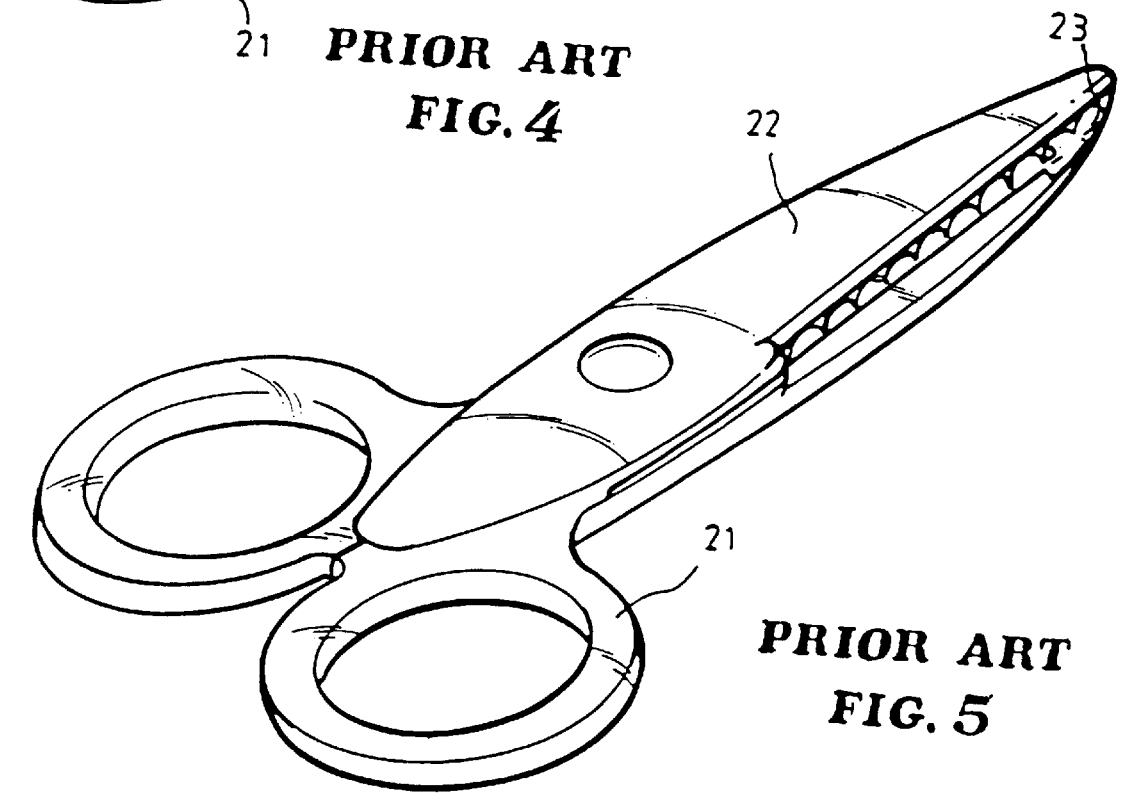
PRIOR ART
FIG. 4
PRIOR ART
FIG. 5

METHOD OF MANUFACTURING BLADES FOR SCISSORS

BACKGROUND OF THE INVENTION

1. Field of the Invention

This invention is related to an improved method of manufacturing blades for scissors.

2. Description of the Prior Art

Referring to FIGS. 4, 5 and 6, the conventional scissors are generally made of steel so that they are heavy and difficult to be operated especially for those with larger sizes. Recently, there is an increasing need for safety scissors for home work and office work and so it has long been desired to develop a kind of scissors which are sharp, lightweight and durable in use. Hence, scissors with plastic handles and steel blades have been designed to meet this need. As shown in FIGS. 4, 5 and 6, such scissors have handles 21 made by injection moulding, blades 22 made of plastic, and L-shaped metal cutters 23 made by pressing. The blade 22 is provided with protuberances 25 adapted to engage with the holes 24 of the cutters 23 and fixedly secured thereto by ultrasonic bonding thereby providing the blade 22 with a metal cutter 23. However, the cutter 23 is made from a sheet of metal by pressing and so the thickness of the cutter 23 is limited by the press and usually below 1 mm thereby making it impossible to do heavy-duty cutting works and therefore limiting its usage.

The metal cutter 23 is only kept in place by the two protuberances 25 so that the stress is concentrated at the two protuberances 25 in use thereby easily loosening the metal cutter 23 and even breaking protuberances 25 and therefore making the scissors unfit for use anymore. Of more importance is the fact that the clearance A between the curved edge of the metal cutter 23 and the blade 22 is very difficult to be cleaned. In addition, the metal cutter is comparatively thin and it is difficult and unfit to be ground so that once it becomes blunt, it will be of no use and has to be discarded.

Therefore, it is an object of the present invention to provide an improved method of manufacturing blades for scissors which obviate and mitigate the above-mentioned drawbacks.

SUMMARY OF THE INVENTION

This invention is related to a method of manufacturing blades for scissors.

According to a preferred embodiment of the present invention, a method of manufacturing a blade for scissors includes steps of: fusing an alloy of zinc and aluminum; filling said alloy into a first mould for manufacturing a metal cutter for scissors; applying high temperature and high pressure to the first mould to form a unitary metal cutter; fitting the metal cutter into a second mould for manufacturing a blade; and squirting viscous resin into the second mould to partially enclose the metal cutter.

It is the primary object of the present invention to provide a method of manufacturing blades for scissors which are thicker than the conventional blade thereby enabling them to be ground when blunted.

It is another object of the present invention to provide a method of manufacturing durable blades for scissors.

It is still another object of the present invention to provide a method of manufacturing blades for scissors which is easy to perform.

It is still another object of the present invention to provide a method of manufacturing blades for scissors which is fit for mass production.

It is a further object of the present invention to provide a method of manufacturing blade for scissors which is for for practical use.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1 is a cutaway view of a blade for scissors according to the present invention;

FIG. 2 illustrates a pair of scissors with the blades according to the present invention;

FIG. 3 is a sectional view taken along line 3—3 of FIG. 1;

FIG. 4 is an exploded view of a conventional scissor;

FIG. 5 is a perspective view of a pair of conventional scissors; and

FIG. 6 is a sectional view taken along line 6—6 of FIG. 4.

DETAILED DESCRIPTION OF THE PREFERRED EMBODIMENT

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

This invention is related to a method of manufacturing a blade for scissors which comprises steps of: fusing an alloy of zinc and aluminum; filling the alloy into a first mould (not shown) made of suitably resistant non-deforming metal for manufacturing a metal cutter for scissors; applying high temperature and high pressure to the first mould to form a unitary metal cutter; fitting the metal cutter into a second mould (not shown) for manufacturing a blade; and squirting viscous resin into the second mould to partially enclose the metal cutter. Then, when the moulds are open, a unitary cutter will be obtained thereby enabling it to be fitted for various kinds of scissors. As the cutter is made of diecasting, it is unnecessary to have the cutter further processed.

With reference to the drawings and in particular to FIGS. 1, 2 and 3, the metal cutter 11 is first made by diecasting as described above and then fitted inside a mould for manufacturing a blade. As the viscous resin is squirted, by means of a plunger, out of a heated cylinder into a water-chilled mould, where it is cooled before removal, thereby forming a plastic enclosure partially enclosing the metal cutter 11. The present invention is characterized in that the metal cutter 11 may be made as an L-shaped member which is thicker than the conventional blade so that the metal cutter 11 can be ground again when blunted.

The difference between the metal cutter 11 according to the present invention and the conventional metal cutter is that the former is made of an alloy of zinc and aluminum and manufactured by diecasting, while the latter made of steel and manufactured by pressing. As we know, steel is relatively heavy in weight and difficult to be processed and so the conventional metal cutter is not suitable to be made thick thereby making it unable to be ground again when blunted. In addition, as the metal cutter 11 is manufactured by diecasting, there will be no noise pollution during manufacture and no machine is required for the manufacture thus ensuring the safety of the operator. Furthermore, the metal cutter 11 may be manufactured to be thicker than the conventional metal cutter 11 thereby enabling it to be ground again when blunted and therefore prolonging its service life.

Regarding cutting efficiency, the metal cutter 11 according to the present invention is much better than the conventional metal cutter, because the metal cutter 11 is integrally manufactured by diecasting and does not have burrs thereby improving the degree of engagement between Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. the two metal cutters 11. In addition, the metal cutter 11 is thicker than the conventional one so that it can be ground for many times when blunted. Moreover, the metal cutter 11 is partially enclosed by a plastic enclosure which can beautify its outlook. As the blade 10 is most made of plastic, the scissors will be lightweight, easy to clean, and appealing in appearance.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A method of manufacturing a blade for scissors comprising steps of:

fusing an alloy of zinc and aluminum;

filling said alloy into a first mould for manufacturing a metal cutter for scissors;

applying high temperature and high pressure to said first mould to form a unitary metal cutter;

fitting said metal cutter into a second mould for manufacturing a blade; and squirting viscous resin into said second mould to partially enclose said metal cutter.

2. The method of manufacturing a blade for scissors as claimed in claim 1, wherein said metal cutter is of an L-shaped cross section.

* * * * *